United States Patent [19]

Camberlin

[11] Patent Number: 5,034,503

[45] Date of Patent: Jul. 23, 1991

[54] NOVEL IMIDO COPOLYMERS

[75] Inventor: Yves Camberlin, Caluire, France

[73] Assignee: Rhone-Poulenc Chimie, Courbevoie, France

[21] Appl. No.: 598,126

[22] Filed: Oct. 16, 1990

[30] Foreign Application Priority Data

Oct. 16, 1989 [FR] France ................................ 89 13713

[51] Int. Cl.$^5$ ............................................. G08G 8/04
[52] U.S. Cl. ...................................... 528/322; 528/96; 528/117; 528/170
[58] Field of Search .................. 528/96, 170, 322, 117

[56] References Cited

U.S. PATENT DOCUMENTS 4,973,649 11/1990 Camberlin ........................... 528/162

Primary Examiner—Morton Foelak

Attorney, Agent, or Firm—Burns, Doane, Swecker and Mathis

[57] ABSTRACT

Novel thermostable imido copolymers, well adapted for the production of prepregs useful in the fabrication of multilayer circuits, are prepared by copolymerizing (a) at least one N,N'-bis-maleimide with (b) at least one sterically hindered diprimary diamine, (c) optionally, at least one ethylenically unsaturated non-halogenated comonomer other than a bis-imide (a), (d) optionally, a free radical polymerization initiator, (e) at least one comonomer including a chlorinated or brominated epoxy resin, an N,N'-alkylene-bis-tetrahalogenophthalimide, a compound containing two phenyl radicals directly joined va a single valence bond, a divalent radical or a bridging atom, wherein such compound each phenyl radical is substituted by a (meth)allyloxy radical and by at least two chlorine or bromine atoms, and/or a non-halogenated epoxy resin, and (f) at least one alkenylphenol.

19 Claims, No Drawings

NOVEL IMIDO COPOLYMERS

BACKGROUND OF THE INVENTION

1. Field of the Invention

The present invention relates to novel thermostable imido copolymers well adapted for the production of prepregs useful in the fabrication of multilayer circuits.

2. Description of the Prior Art

French Patent Application A-2,608,613 describes imido polymers and thermosetting prepolymers thereof, comprising the copolymerization reaction product, carried out at a temperature ranging from 50° C. to 300° C., of:

(a) one or more N,N'-bis-imides of the formula:

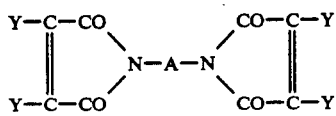

in which the symbols Y, which may be identical or different, are each H, CH$_3$ or Cl; and the symbol A is a divalent radical selected from among cyclohexylene, phenylenes, 4-methyl-1,3-phenylene, 2-methyl-1,3-phenylene, 5-methyl-1,3-phenylene and 2,5-diethyl-3-methyl-1,4-phenylene, or a radical of the formula:

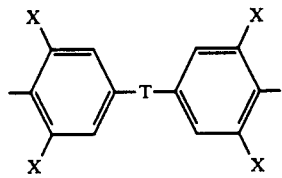

wherein T is a single valence bond or one of the groups:

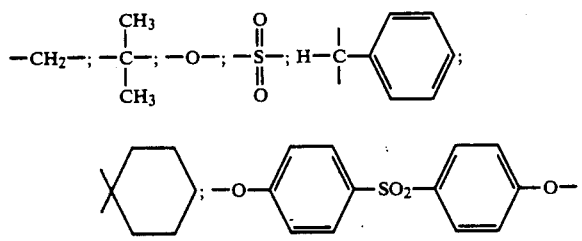

and the symbols X, which may be identical or different, are each a hydrogen atom or a methyl, ethyl or isopropyl radical;

(b) one or more sterically hindered diprimary diamines selected from among (i) the compounds of the general formula:

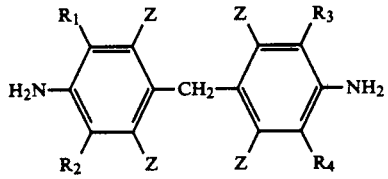

wherein the symbols $R_1$, $R_2$, $R_3$ and $R_4$, which may be identical or different, are each a methyl, ethyl, propyl or isopropyl radical; and the symbols Z, which may be identical or different, are each a hydrogen atom or a chlorine atom; and (ii) the compounds of the general formula:

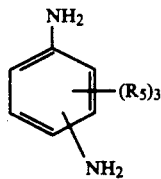

wherein the amino radicals are in the meta or para position relative to each other; and the symbols $R_5$, which may be identical or different, are each a methyl, ethyl, propyl or isopropyl radical;

(c) if appropriate, one or more non-halogenated monomers other than a bis-imide of formula (I) and comprising one or more polymerizable carbon-carbon double bonds; and (d) if appropriate, a polymerization catalyst.

A primary advantage of the polymers described in the above '613 French patent application is a result of the steric hindrance of the amine reactant (b), which is responsible for the fact that the reactivity of the constituents of the polymerization medium is lower than in the case of using the polyamino-bis-maleimides derived from non-hindered diamines. This lower reactivity of the constituents of the polymerization medium is of particular interest not only in the production of moldings from a prepolymer in the molten state, but also in the production of moldings from a prepolymer in the form of a solution in a solvent. Indeed, the viscosity of the prepolymer in the molten state or that of the solution of the prepolymer changes less, which greatly facilitates the processing of the prepolymer, especially in applications requiring a working time on the order of several hours.

Another advantage of the polymers described in the '613 French patent application is that they are prepared without having to take particular precautions from the standpoint of health and hygiene, since the sterically hindered diamines (b) employed did not present the toxicity hazards generally associated with the non-hindered aromatic diprimary diamines.

SUMMARY OF THE INVENTION

A major object of the present invention is the provision of novel imido copolymers that differ from those of the aforesaid French patent application in that such novel imido copolymerizates include the following two additional comonomers:

(i) a compound selected from among a chlorinated or brominated epoxy resin; an N,N'-alkylene-bis-tetrahalogenophthalimide; a compound containing two phenyl radicals directly joined via a single valence bond, a divalent radical or a bridging atom, in which compound each phenyl radical is substituted by a (meth)allyloxy radical and by at least two chlorine or bromine atoms; a non-halogenated epoxy resin; and a mixture of any two or more of the above compounds (the comonomer (i), in particular, imparts a low coefficient of thermal expansion to the resulting copolymerizates, as well as excellent combustion and flame resistance in the event that a halogenated compound is selected); and (ii) an alkenylphenol; this comonomer (ii), in particular, permits enhancing the resilience properties of the cured polymer and its adhesion properties (evaluated, for example, by peel strength measurements) on a metal substrate such as, for example, a copper sheet.

Another object of the present invention is the provision of novel imido copolymerizates that are advantageously used, for example, for the manufacture of pre-impregnated intermediate articles. These "prepregs" are useful for the fabrication, in a manner known per se, of multilayer electronic circuits for which the conventional operations of cutting, machining and especially hole drilling do not result in serious defects such as, in particular, delamination, intralaminar crazing and tearing phenomena.

It has also now unexpectedly been found that, on the one hand, the types of sterically hindered diprimary diamines which are included in the copolymerizates of the present invention can be expanded to include species of the formula (II) containing two 4-aminophenyl radicals which are sterically hindered, but in this instance are joined together via a divalent radical other than —CH$_2$—; on the other hand, the optional catalyst in the polymerization recipe is a free radical polymerization initiator.

Briefly, the present invention features novel imido polymers comprising the copolymerization reaction product, at a temperature ranging from 50° C. to 300° C., of:

(a) at least one N,N'-bis-imide of formula (I) described above;

(b) at least one sterically hindered aromatic diprimary diamine;

(c) if appropriate, at least one non-halogenated monomer other than a bis-imide of formula (I) and containing one or more polymerizable carbon-carbon double bonds; and (d) also if appropriate, a polymerization catalyst; with the proviso that said amine reactant (b) comprises one or more sterically hindered diprimary diamines selected from among those of the following formulae (III) and (IV):

(1) a compound of the formula:

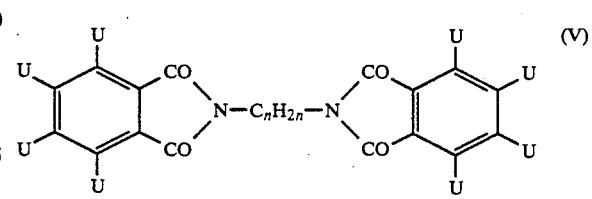

in which the symbols $R_1$, $R_2$, $R_3$ and $R_4$, which may be identical or different, are each a methyl, ethyl, propyl or isopropyl radical; the symbols Z, which may be identical or different, are each a hydrogen atom or a chlorine atom; and the symbol B is a divalent radical selected from among:

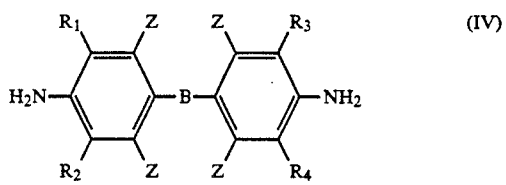

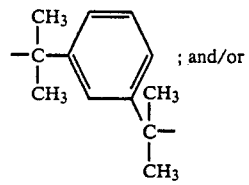

(2) a compound of the formula:

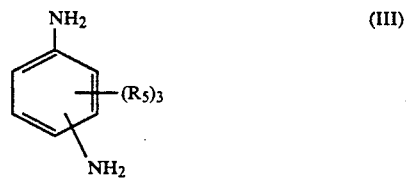

in which the amino radicals are in the meta or para position relative to each other; and the symbols $R_5$, which may be identical or different, are each a methyl, ethyl, propyl or isopropyl radical; and said copolymerization recipe further comprising:

(e) a compound selected from among:
(e1) a chlorinated or brominated epoxy resin;
(e2) an N,N'-alkylene-bis-tetrahalogenophthalimide of the formula:

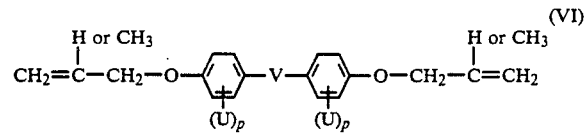

in which the symbols U, which may be identical or different, are each a chlorine or bromine atom; the alkylene radical —C$_n$H$_{2n}$— can be linear or branched; and n is an integer equal to 1, 2, 3 or 4;

(e3) a halogenated compound of the formula:

$$\text{CH}_2=\overset{\text{H or CH}_3}{\underset{|}{\text{C}}}-\text{CH}_2-\text{O}-\underset{(\text{U})_p}{\bigcirc}-\text{V}-\underset{(\text{U})_p}{\bigcirc}-\text{O}-\text{CH}_2-\overset{\text{H or CH}_3}{\underset{|}{\text{C}}}=\text{CH}_2 \quad \text{(VI)}$$

in which the symbols U are as defined above; the symbol V is a single valence bond, a linear or branched alkylene radical —C$_n$H$_{2n}$—, wherein n is equal to 1, 2, 3 or 4, or an oxygen atom; and p is an integer equal to 2, 3 or 4;

(e4) a non-halogenated epoxy resin; and
(e5) a mixture of two or more of the above compounds (e1) to (e4); and
(f) one or more alkenylphenols of the formula:

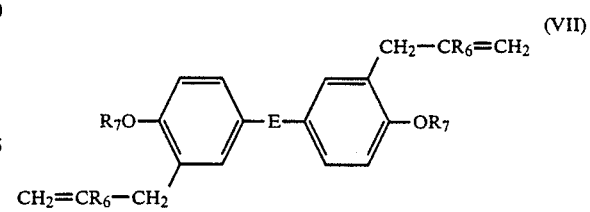

in which the symbol E is a single valence bond or a divalent radical selected from among:

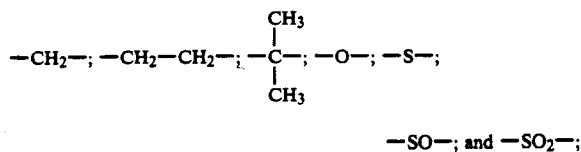

$-SO-$; and $-SO_2-$;

the symbols $R_6$, which may be identical or different, are each a hydrogen atom or a methyl radical; and the symbols $R_7$, which may be identical or different, are each a hydrogen atom, a linear or branched alkyl radical having from 1 to 6 carbon atoms, or a phenyl radical; and with the added proviso that, in the event that a catalyst (d) is used, the reaction medium contains, as such catalyst, a free radical polymerization initiator that is an organic peroxide or azo-bis-isobutyronitrile.

DETAILED DESCRIPTION OF THE PREFERRED EMBODIMENT OF THE INVENTION

More particularly according to the present invention, by "chlorinated or brominated epoxy resin" (e1) is intended an epoxy resin which has an epoxy equivalent weight ranging from 200 to 2,000 and which comprises a glycidyl ether prepared by reacting, with epichlorohydrin, a polyphenol chlorinated or brominated on the aromatic ring(s) and selected from among the bis(hydroxyphenyl)-alkanes such as 2,2-bis(4-hydrophenyl)-propane, bis(4-hydroxyphenyl)methane, bis(4-hydroxyphenyl)-methylphenylmethane and bis(4-hydroxyphenyl)-tolylmethanes; resorcinol; hydroquinone; pyrocatechol; 4,4'-dihydroxybiphenyl; and the condensation products of the above phenols with an aldehyde.

By the expression "epoxy equivalent weight" is intended the weight of resin (in grams) which contains one epoxy functional group

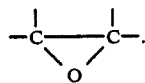

It is preferred to select a chlorinated or brominated epoxy resin having an epoxy equivalent weight ranging from 250 to 500. It is most preferred to use an epoxy resin (e1) selected from among the glycidyl ethers of bis(hydroxyphenyl)alkanes, brominated on the aromatic rings, which were referred to above in respect of the detailed definition of the resin (e1).

It is preferred to use an N,N'-alkylene-bistetrabromophthalimide as the compound (e2) of formula (V). It is most preferred to use N,N'-ethylene-bis-tetrabromophthalimide.

It is preferred to select a bis(allyloxydibromophenyl)alkane of the formula:

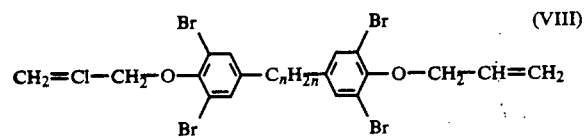

in which n is an integer equal to 1, 2 or 3, as the compound (e3) of formula (VI). It is most preferred to use 2,2-bis(4-allyloxy-3,5-dibromophenyl)propane.

By "non-halogenated epoxy resin" (e4) is intended an epoxy resin which has an epoxy equivalent weight ranging from 100 to 1,000 and which comprises a glycidyl ether prepared by reacting, with epichlorohydrin, a polyphenol not chlorinated or not brominated on the aromatic ring(s) and selected from the group of phenols referred to above in respect of the definition of the resin (e1).

It is preferred to use a non-halogenated epoxy resin having an epoxy equivalent weight ranging from 150 to 300. It is most preferred to use an epoxy resin (e4) comprising a resin selected from among the glycidyl ethers of bis(hydroxyphenyl)-alkanes, not halogenated on the aromatic rings, which were referred to above in respect of the detailed definition of the resin (e1).

As the mixtures (e5), it is preferred to use a mixture of two or more of the preferred compounds (e1) to (e4) indicated above.

The amount of additive (e) generally represents 2% to 30% and preferably 3% to 15% of the weight of the mixture bis-imide(s) (a)+diamine(s) (b)+if appropriate, reactant (c).

It has now been determined that the amount of chlorine or bromine which can be introduced into the polymers according to the invention by the additive (e) is likely to influence certain properties of the cured polymers obtained, especially the properties relating to heat stability and those relating to adhesion of the polymers to metals such as, for example, copper. In this regard, the best results are obtained when this amount of chlorine or bromine introduced by the additive (e), expressed as the percentage by weight of elemental chlorine or elemental bromine relative to the weight of the overall mixture bis-imide(s) (a)+diamine(s) (b)+optional reactant (c)+additives (e) and (f), represents at most 8%; this amount of chlorine or bromine preferably ranges from 1% to 6%. The amount of chlorine or bromine can easily be adjusted to the desired value by using, for example, epoxy resins (e1) containing more or less chlorine or bromine, or by using starting mixtures of chlorinated or brominated epoxy resins (e1) with non-halogenated epoxy resins (e4), or else by using starting mixtures of compounds (e2) and/or (e3) with non-halogenated epoxy resins (e4).

The following are particularly exemplary alkenylphenols of formula (VII):
4,4'-Dihydroxy-3,3'-diallylbiphenyl;
Bis(4-hydroxy-3-allylphenyl)methane;
Bis(4-hydroxy-3-allylphenyl) ether;
2,2-Bis(4-hydroxy-3-allylphenyl)propane;
0,0'-Diallybisphenol A; or
The methyl ether corresponding to one or another of the aforesaid alkenylphenols.

As is well known to this art, the alkenylphenols are prepared by the thermal rearrangement (Claisen) of allyl ethers of phenols, said allyl ethers being obtained in a manner known per se, for example by reacting phenols with allyl chloride in the presence of an alkali metal hydroxide and solvents.

By the expression "compound comprising one or more alkenylphenols" is intended that the additive (f) can comprise:
(i) either one or more alkenylphenols of the formula (VII); or
(ii) a mixture containing (i) one or more alkenylphenols of formula (VII) and (2i) one or more corresponding allyl ethers of said phenol(s), i.e., one or more allyl ethers from which said phenol(s) is (are) derived by rearrangement. One example of such a mixture (2i) which can advantageously be used is the crude product obtained by partial thermal rearrangement of the corresponding allyl ether(s).

The present invention is preferably carried out using an additive (f) which comprises 0,0'-diallybisphenol A alone, or in admixture with the diallyl ether of bisphenol A.

The amount of additive (f) generally represents 2% to 30% and preferably 5% to 15% of the weight of the mixture bis-imide(s) (a)+diamine(s) (b)+if appropriate, reactant (c).

The compounds described in French patent application A-2,608,613 are especially representative of the bis-imides (a) of formula (I), i.e.:
N,N'-Metaphenylene-bis-maleimide;
N,N'-Paraphenylene-bis-maleimide;
N,N'-4,4'-Diphenylmethane-bis-maleimide;
N,N'-4,4'-Diphenyl ether bis-maleimide;
N,N'-4,4'-Diphenyl sulfone bis-maleimide;
N,N'-1,4-Cyclohexylene-bis-maleimide;
N,N'-4,4'(1,1-Diphenylcyclohexane)-bis-maleimide;
N,N'-4,4'-(2,2-Diphenylpropane)-bis-maleimide;
N,N'-4,4'-Triphenylmethane-bis-maleimide;
N,N'-1,3-(2-Methylphenylene)-bis-maleimide;
N,N'-1,3-(4-Methylphenylene)-bis-maleimide;
N,N'-1,3-(5-Methylphenylene)-bis-maleimide.

These bis-maleimides can be prepared by the processes described in U.S. Pat. No. 3,018,290 and British patent application A-1,137,290. N,N'-4,4'-Diphenylmethane-bis-maleimide is preferably used, either alone or in a mixture with N,N'-1,3-(2-methylphenylene)-bis-maleimide, N,N'-1,3-(4-methylphenylene)-bis-maleimide and/or N,N'-1,3-(5-methylphenylene)-bis-maleimide.

The following are particularly representative examples of the sterically hindered diamines (b) of formulae (IV) and (III):
4,4'-Diamino-3,3',5,5'-tetramethyldiphenylmethane;
4,4'-Diamino-3,3',5,5'-tetraethyldiphenylmethane;
4,4'-Diamino-3,5-dimethyl-3',5'-diethyldiphenylmethane;
4,4'-Diamino-3,3'-diethyl-5,5'-dimethyldiphenylmethane;
4,4'-Diamino-3,3',5,5'-tetra-isopropyldiphenylmethane;
4,4'-Diamino-3,3'-diisopropyl-5,5'-dimethyldiphenylmethane;
1,4-Bis(4-amino-3,5-dimethyl-α,α-dimethylbenzyl)benzene;
1,3-Bis(4-amino-3,5-dimethyl-α,α-dimethylbenzyl)benzene;
1,3-Diamino-2,4-diethyl-6-methylbenzene;
1,3-Diamino-2-methyl-4,6-diethylbenzene.

These sterically hindered diamines can be prepared by the processes described in British patent application A-852,651 and U.S. Pat. No. 3,481,900. The present invention is preferably carried out using 4,4'-diamino-3,3',5,5'-tetramethyldiphenylmethane, 4,4'-diamino-3,3',5,5'-tetraethyldiphenylmethane, 4,4'-diamino-3,3'-diethyl-5,5'-dimethyldiphenylmethane, on mixtures thereof.

The amounts of N,N'-bis-imide(s) (a) and sterically hindered diamine(s) (b) are selected such that the ratio r:

$$r = \frac{\text{number of mol of bis-imide(s) (a)}}{\text{number of mol of diamine(s) (b)}}$$

advantageously ranges from 1.5/1 to 20/1 and preferably from 2/1 to 5/1.

It may be advantageous in certain cases to modify the polymers according to the present invention by the additional use of a copolymerizable reactant (c) and/or a, catalyst (d).

The compounds described in French patent application A-2,608,613 are particularly suitable optional reactants (c), namely:
(c1) either one or more monomers of the formula

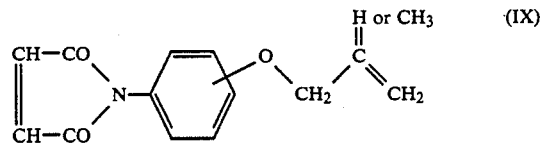

in which the allyloxy or methallyloxy radical is in the ortho, meta or para position relative to that carbon atom of the benzene ring which is joined to the nitrogen;
(c2) or a compound comprising:
a mixture of a monomer of the formula

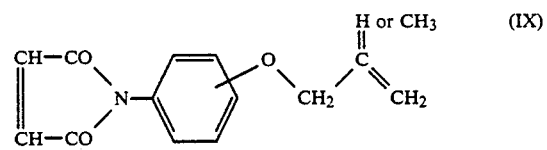

in which the allyloxy or methallyloxy radical is in the ortho, meta or para position relative to that carbon atom of the benzene ring which is joined to the nitrogen, with:
at least one monosubstituted derivative of the formula

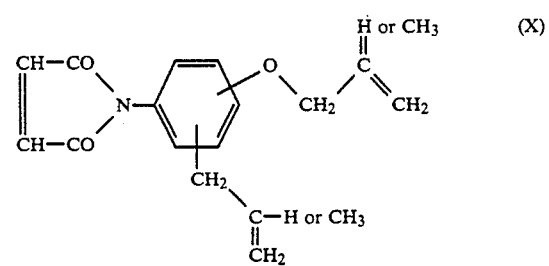

and, if appropriate, one or more disubstituted derivatives of the formula

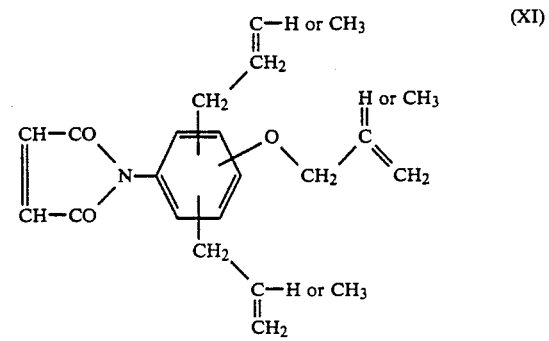

In the above composition used as reactant (c2), the proportions of the various constituents of the mixture of the products of formulae (IX), (X) and, if appropriate, (XI) can vary over wide limits. In general, the proportions of the constituents are selected from within the following limits (expressing the percentage by weight of each of the constituents in the mixture):

(i) at least 30% and preferably 50% to 80% of the N-(meth)-allyloxyphenylmaleimide of formula (IX);

(ii) from 5% to 50% and preferably from 10% to 35% of the mono(meth)allyl-substituted derivative(s) of formula (X); and (iii) from 0% to 20% and preferably from 0% to 15% of the di-(meth)allyl-substituted derivative(s) of formula (XI), with the proviso that the sum of the constituents in each case is equal to 100% by weight.

(c3) or one or more substituted heterocycles containing one or more carbon-carbon double bonds.

It will be appreciated that mixtures (c1+c3) or (c2+c3) can be used as the reactant (c).

The optional reactant (c1) is advantageously selected from among:

N-(2-Allyloxyphenyl)maleimide;
N-(3-Allyloxyphenyl)maleimide;
N-(4-Allyloxyphenyl)maleimide;
N-(2-Methallyloxyphenyl)maleimide;
N-(3-Methallyloxyphenyl)maleimide;
N-(4-Methallyloxyphenyl)maleimide; and mixtures thereof.

The maleimides of formula (IX) are known compounds which are described in European patent application A-0,208,634.

As regards the optional reactant (c2), this is preferably a mixture of N-(meth)allyloxyphenylmaleimide of formula (IX) with one or more (meth)allyl-substituted derivatives of formula (X) and, if appropriate, formula (XI), the crude product being prepared by the process described in European patent application A-0,274,967.

The optional reactant (c3) is advantageously selected from among the vinylpyridines, N-vinylpyrrolidone, allyl isocyanurate, vinyltetrahydrofuran, and mixtures thereof.

The amount of optional reactant (c) generally represents less than 60% and preferably from 2% to 25% of the total weight of the reactants (a) and (b).

The optional catalyst (d) is a free radical polymerization initiator which is advantageously an organic peroxide such as, for example, dicumyl peroxide or lauroyl peroxide, or azo-bis-isobutyronitrile.

Depending on the nature of the compound (d) and the desired polymerization rate at the processing stage, the catalyst is used in a proportion which typically ranges from 0.01% to 5% and preferably ranges from 0.1% to 1% by weight relative to the reactants (a)+(b-)+if appropriate, (c), taken together.

Various adjuvants can be incorporated at various times into the polymers according to the invention. These adjuvants, which are common and are well known to this art, can be, for example, stabilizers or degradation inhibitors, lubricants or demolding agents, dyes or pigments, and fillers in the form of powder or particles, such as silicates, carbonates, kaolin, chalk, powdered quartz, mica or glass microbeads. It is also possible to incorporate adjuvants which modify the physical structure of the product obtained, examples thereof being pore-forming agents or fibrous reinforcing agents such as, in particular, fibrils of carbon or aromatic polyimide or polyamide, and whiskers.

The polymers according to the invention can be prepared by direct heating of the bis-imide(s) (a), the amine reactant (b) and the additives (e) and (f), if appropriate in the presence of the reactant (c) and/or the catalyst (d), at least until a homogeneous liquid mixture is obtained. The temperature can vary according to the physical state of the compounds present in the mixture, but it generally ranges from 50° C. to 300° C. It is advantageous to convert the starting compounds into the form of an intimate mixture and to maintain them in this state, before and during heating, for example by means of thorough stirring. When the reactant (c) and/or the catalyst (d) are used, they are preferably added to the well-stirred reaction mixture after the mixture (a)+(b)-+(e)+(f) has been melted. If the catalyst (d) is particularly active, it is desirable to add it in a solvent or diluent compatible with the reaction medium, in order to prevent it from becoming encapsulated in the polymer network generated. It has been determined that it can be advantageous to use, as the solvent or diluent, one of the polar organic liquids referred to below.

The polymers according to the invention can also be prepared by heating the mixture of reactants in the presence of variable amounts of an organic diluent which is liquid over at least part of the range 50° C. to 250° C. Particularly representative such diluents include the aromatic hydrocarbons such as xylenes and toluene, halogenated hydrocarbons such as chlorobenzenes, and polar organic liquids such as dioxane, tetrahydrofuran, dibutyl ether, dimethylformamide, dimethyl sulfoxide, N-methylpyrrolidone, dimethylacetamide, cyclohexanone, methyl glycol and methyl ethyl ketone. The solutions or suspensions of polymers can be used as such for numerous purposes; the polymers can also be isolated, for example by filtration, if necessary after precipitation by means of an organic diluent miscible with the solvent used.

It should be appreciated that the properties of the polymers according to the invention can vary over wide limits, especially depending upon the exact nature of the reactants employed, the selected proportions of reactants and the precise temperature conditions from within the above range. The polymers obtained can be cured polymers which are insoluble in the typical solvents such as, for example, the polar organic liquids mentioned in the previous paragraph, and which do not exhibit appreciable softening below the temperature at which they start to degrade.

However, these polymers can also be in the form of prepolymers (P) which are soluble in polar organic solvents such as, for example, those mentioned above, and which have a softening point at a temperature below 200° C. [this softening point generally ranges from 50° C. to 150° C.]. These prepolymers can be prepared in bulk by heating the mixture of reactants until a homogeneous or pasty product is obtained, at a temperature generally ranging from 50° C. to 180° C. and for a period of time which advantageously ranges from a few minutes to a few hours, this time being the shorter the higher the temperature selected. Before the mixture of reactants is heated, it is again advantageous to stir them beforehand to form an intimate mixture. Here, too, there is a preferred method of introducing the reactant (c) and/or the optionally catalyst (d), namely, the method indicated above in the context of the direct preparation of cured polymers. The prepolymers can also be prepared in the presence of variable amounts of a diluent which is liquid over at least polar part of the range 50° C. to 180° C. In this respect, the polar organic liquids referred to above can advantageously be used as diluents.

The prepolymers (P) can be used in the form of a liquid mass, simple hot casting being sufficient for the shaping thereof and for the production of molded shaped articles. They can also be used, after cooling and grinding, in the form of powders, which are remarkably suitable for, compression molding operations, if appropriate in the presence of fillers in the form of powders, spheres, granules, fibers or flock. In the form of suspensions or solutions, the prepolymers (P) can be used for the production of coatings and preimpregnated intermediate articles (prepared) in which the reinforcement can be fibrous materials based on aluminum or zirconium silicate or oxide, carbon, graphite, boron, asbestos or glass. It is also possible to use these prepolymers (P) for the production of cellular materials after the incorporation of a pore-forming agent such as, for example, azodicarbonamide.

In a second stage, the prepolymers (P) are cured by heating to temperatures on the order of 300° C., typically ranging from 150° C. to 300° C.; complementary shaping can be carried out during curing, if necessary under vacuum or under superatmospheric pressure, it also being possible for these operations to be consecutive.

In one preferred embodiment of the present invention, the operation is carried out in two stages, the first stage entailing heating the mixture of reactants to a temperature ranging from 50° C. to 180° C. to form a prepolymer (P), and the second stage entailing curing the prepolymer (P), after having appropriately shaped such prepolymer, by heating to temperatures on the order of 300° C., typically ranging from 150° C. to 300° C.

In another preferred embodiment of the present invention, the operation is carried out in two stages, but a continuous process for the preparation of the prepolymer (P) is used in the first stage, said process entailing introducing the following materials separately into a kneading machine provided with an extruder screw:

(i) on the one hand, the bis-imide (a) in the divided solid state, and (ii) on the other, the group of reactants including the amine reactant (b) and the additive (f) in the solid, liquid or molten state, and the additive (e) in the liquid state, if necessary with the reactant (c) in the liquid state and/or the catalyst (d) in the solid state or in solution, it being possible for the various reactants in this group to themselves be introduced together or separately, if appropriate in the presence of a diluent which is liquid over at least part of the range 50° C. to 180° C.

By the expression "kneading machine provided with an extruder screw" is intended an apparatus which does not have a dead zone as the material advances. Apparatus of this type which can contain one or more screws is described in the text by E. G. Fisher, *Extrusion of Plastics* (Interscience Publisher 1964), pages 104 to 108. These kneading machines can contain two closely intermeshing and co-rotating endless screws; apparatus of this type especially adapted for the preparation of alkali metal terephthalates is described in French patent application A-1,462,935. Another variety of kneading machine which can be used is that apparatus containing an endless screw with interrupted thread, simultaneously performing a rotatory movement and an oscillatory movement in the direction of the axis, and housed in an envelope carrying teeth which cooperate with the interrupted fins on the screw. Apparatus of this type is described in French patent applications A-1,184,392, 1,184,393, 1,307,106 and 1,369,283.

The polymers according to the invention are of interest in those industrial applications which require materials possessing good mechanical and electrical properties, as well as a high chemical inertness at temperatures of 200° C. to 300° C. For example, they are particularly suitable for the manufacture of preimpregnated intermediate articles, for example of the type woven glass fabric/prepolymer (P), which make it possible to produce, under the best conditions, multilayer circuits for the computer industry and for astrionics, avionics and industrial electronics. These prepregs enable the speed of hole drilling in the circuits to be increased, even when these holes are very close together, as is the case for circuits of high component density.

In order to further illustrate the present invention and the advantages thereof, the following specific example is given, it being understood that same is intended only as illustrative and in nowise limitative.

EXAMPLE

The following materials were introduced at room temperature into a glass reactor equipped with an anchor stirrer:

(i) 80 g (0.223 mol) of N,N'-4,4'-diphenylmethane-bis-maleimide;

(ii) 20 g (0.064 mol) of 4,4'-diamino-3,3',5,5'-tetraethyldiphenylmethane;

(iii) 10 g (0.032 mol) of O,O'-diallylbisphenol A; and (iv) 9 g of a brominated epoxy resin produced by the condensation of tetrabrominated bisphenol A with epichlorohydrin; it had an elemental bromine content on the order of 50% by weight and an epoxy equivalent weight of 450 and is commercially available under the registered trademark QATREX from DOW, type 6410. The amount of bromine introduced by the epoxy resin, expressed as the percentage by weight of elemental bromine relative to the weight of the bis-imide+diamine+copolymerizable monomer (N-vinlypyrrolidone: cf. below)+epoxy resin+allylphenol, taken together, was equal to 3.54%. This resin was introduced into the reactor in the form of a solution in 5 g of cyclohexanone.

The reactor was immersed in an oil bath preheated to 160° C. and the mixture was stirred until the ingredients employed had completely melted and a homogeneous mass was obtained. This step required 5 minutes. The molten mixture obtained in this manner was cooled to 130° C., 8 g of N-vinylpyrrolidin-2-one were introduced and the entire mass was then permitted to react for 20 minutes, with stirring.

This provided a prepolymer having a softening point of about 80° C. The softening point is the approximate temperature at which a glass rod 6 mm in diameter can easily penetrate a few millimeters into the prepolymer. This prepolymer was soluble in solvents such as, for example, N-methylpyrrolidone, dimethylformamide, cyclohexanone and acetone.

A first batch of prepolymer prepared as indicated above was used to fabricate prepregs and 10-ply coppered laminates (10 layers of prepregs). This was carried out using a 50% by weight solution of prepolymer in N-methylpyrrolidone to coat a woven glass fabric manufactured by PORCHER under the reference 7628, which weighed 200 g/m² and had been treated with gamma-aminopropyltriethoxysilane (silane A 1100 from UNION CARBIDE). The impregnated fabric contained 40 g of prepolymer per 60 g of fabric. It was dried in a ventilated atmosphere at 160° C. for 5 minutes. 10 squares (15×15 cm) were then cut therefrom and stacked with a 35 μm thick copper foil (marketed by YATES under the reference NT-TWS) placed on one of the outer face surfaces of the stack, and the entire array was placed between the platens of a press under the following conditions:

Pressure: 40.10⁵ Pa,

Heating of the press platens: 1 hour at 190° C.

After postcuring at 200° C. for 16 hours, the adhesion of the copper to the 10-ply laminate prepared was examined. This adhesion, measured on a dynamometer by traction of the copper at an angle of 90 (according to standard MIL P 55 617 B at a traction speed of 55 mm/min), was on the order of 23 N/cm. Under the same conditions, the 10-ply coppered laminate produced from a prepolymer prepared as indicated above, but without O,O'-diallylbisphenol A, resulted in an adhesion on the order of 19.6 N/cm.

A second batch of prepolymer was used to prepare prepregs containing 45% by weight of prepolymer and 5-ply laminates under the conditions described above (note that no copper foil was used here). After postcuring at 200° C. for 16 hours, combustibility measurements were carried out by means of the vertical UL 94 test (thickness of the laminate-based test pieces: 0.8 mm; the resin content of the laminate was about 40% by weight; the combustion time was determined after conditioning for 48 hours at 23° C. and under 50% relative humidity; the classification was established as the average of 10 results: 5 test pieces and 2 tests on each test piece): classification VO.

A third batch of prepolymer, ground into powder form, was used as compression molding. The powder obtained was introduced, in an amount of 7.5 g, into a cylindrical mold (diameter: 10 cm) and the entire assembling was placed between the two circular platens of a press (these platens were adapted to the size of the mold and preheated to 150° C.), to which a pressure of 0.1 MPa was applied. When the temperature of the material reached 125° C., a pressure of 4 MPa was applied. When thermal equilibrium was reached, i.e., when the temperature of the material was 150° C., the assembling was maintained under these conditions for an additional 2 hours. The mold and its contents were then permitted to cool for 1 hour under a pressure of 4 MPa. After demolding, a cylindrical molded article was obtained (diameter: 10 cm; height: 4 mm) which wa placed for 16 hours in an oven preheated to 200° C. After demolding, the molded shaped article was subjected to CHARPY unnotched impact strength tests, according to standard NF T 51035, in order to measure the surface resilience Rc at 23° C.; this resilience was determined to be equal to 18 kJ/m². Under the same conditions, the molded shaped article produced from a prepolymer prepared as indicated above, but without the O,O'-diallylbisphenol A, resulted in a resilience which was determined to be equal to 12 kJ/m². The crack propagation energy GIC was also measured according to standard ASTM E 399, it was determined to be equal to 90 J/m². In the absence of diallylphenol, it was determined to be equal to 60 J/m².

A fourth batch of prepolymer was used to prepare prepregs containing 40% by weight of prepolymer and 22-ply laminates under the conditions described above (no copper foil was used either here). After postcuring at 200° C. for 16 hours, the coefficient of thermal expansion along the Z axis of the laminates was measured (thickness of the laminate-based test pieces: 3 mm). These measurements were carried out by thermomechanical analysis (TMA) using a DU PONT model 982 apparatus, at a rate of temperature increase of 10° K/min, under a nitrogen atmosphere. The value found for this coefficient was on the order of $35.10^{-6}$ m.m$^{-1}$.K$^{-1}$.

Furthermore, the glass transition temperature of the cured polymer, which was evaluated during the measurements carried out by thermomechanical analysis, was determined to be equal to 250° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A imido copolymer comprising the copolymerizate of:

(a) at least one N,N'-bis-imide having the formula:

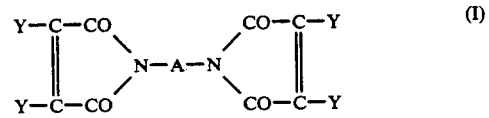

in which the symbols Y, which may be identical or different, are each H, CH$_3$ or Cl; and the symbol A is a cyclohexylene, phenylene, 4-methyl-1,3-phenylene, 2-methyl-1,3-phenylene, 5-methyl-1,3-phenylene or 2,5-diethyl-3-methyl-1,4-phenylene radical, or a radical of the formula:

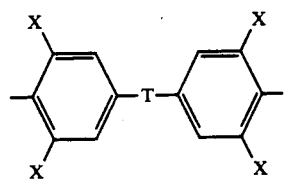

wherein T is a single valence bond or one of the groups:

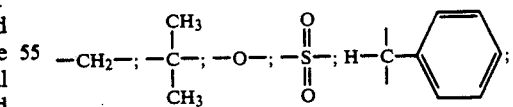

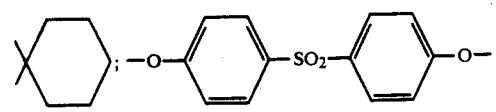

and the symbols X, which may be identical or different, are each a hydrogen atom or a methyl, ethyl or isopropyl radical;

(b) at least one sterically hindered diprimary diamine of the formulae (III) and/or (IV):

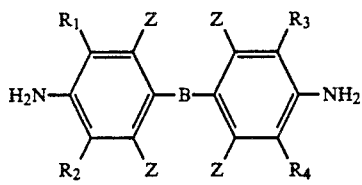

in which the symbols $R_1$, $R_2$, $R_3$ and $R_4$, which may be identical or different, are each a methyl, ethyl, propyl or isopropyl radical; the symbols Z, which may be identical or different, are each a hydrogen atom or a chlorine atom; and the symbol B is a divalent radical selected from among:

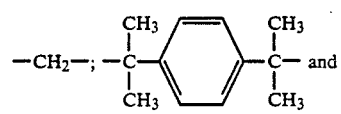

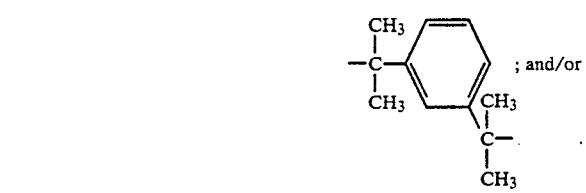

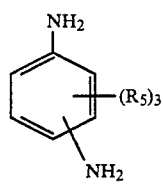

in which the amino radicals are in the meta or para position relative to each other; and the symbols $R_5$, which may be identical or different, are each a methyl, ethyl, propyl or isopropyl radical;

(c) optionally, at least one non-halogenated monomer other than a bis-imide of formula (I) and containing one or more polymerizable carbon-carbon double bonds;

(d) optionally, an organic peroxide or azo-bisisobutyronitrile free radical polymerization initiator;

(e) at least one comonomer selected from among:,
 (e1) a chlorinated or brominated epoxy resin;
 (e2) an N,N'-alkylene-bis-tetrahalogenophthalimide of the formula:

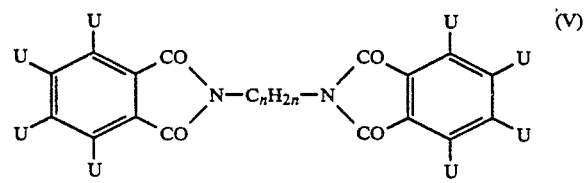

in which the symbols U, which may be identical or different, are each a chlorine or bromine atom, the alkylene radical —$C_nH_{2n}$— can be linear or branched, and n is an integer equal to 1, 2, 3 or 4;

(e3) a halogenated compound of the formula:

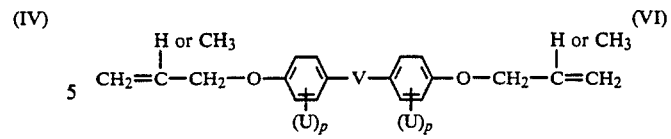

in which the sYmbols U are as defined above, the symbol V is a single valence bond, a linear or branched alkylene radical —$C_nH_{2n}$—, wherein n is equal to 1, 2, 3 or 4, or an oxygen atom; and p is an integer equal to 2, 3 or 4;

(e4) a non-halogenated epoxy resin; and/or (e5) a mixture of two or more of the above comonomers (e1) to (e4); and (f) at least one alkenylphenol of the formula:

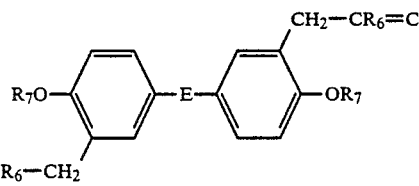

in which the symbol E is a single valence bond or one of the divalent radicals:

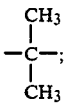

—SO—; and —$SO_2$—;

the symbols $R_6$, which may be identical or different, are each a hydrogen atom or a methyl radical; and the symbols $R_7$, which may be identical or different, are each a hydrogen atom, a linear or branched alkyl radical having from 1 to 6 carbon atoms, or a phenyl radical.

2. The imido copolymer as defined by claim 1, said at least one N,N'-bis-imide (a) comprising N,N'-metaphenylene-bis-maleimide; N,N'-paraphenylene-bis-maleimide; N,N'-4,4'-diphenylmethane-bis-maleimide; N,N'-4,4'-diphenyl ether bis-maleimide; N,N'-4,4'-diphenyl sulfone bismaleimide; N,N'-1,4-cyclohexylene-bis-maleimide; N,N'-4,4'-(1,1-diphenylcyclohexane)-bis-maleimide; N,N'-4,4'-(2,2-diphenylpropane)-bis-maleimide; N,N'-4,4'-triphenylmethane-bis-maleimide; N,N'-1,3-(2-methylphenylene)-bis-maleimide;, N,N'-1,3-(4-methylphenylene)-bis-maleimide; N,N'-1,3-(5-methylphenylene)-bis-maleimide or mixture thereof.

3. The imido copolymer as defined by claim 1, said at least one sterically hindered diprimary diamine (b) comprising 4,4'-diamino-3,3',5,5'-tetramethyldiphenylmethane, 4,4'-diamino-3,3',5,5'-tetraethyldiphenylmethane, 4,4'-diamino-3,5-dimethyl-3',5'-diethyldiphenylmethane, 4,4'-diamino-3,3'-diethyl-5,5'-dimethyldiphenylmethane, 4,4'-diamino-3,3',5,5'-tetraisopropyldiphenylmethane, 4,4'-diamino-3,3'-diisopropyl-5,5'-dimethyldiphenylmethane, 1,4-bis(4-amino-3,5-dimethyl-α,α-dimethylbenzyl) benzene, 1,3-bis(4-amino-3,5-dimethyl-α,α-dimethylbenzyl) benzene, 1,3-diamino-2,4-diethyl-6-methylbenzene, 1,3-diamino-2-methyl-4,6-diethylbenzene, or mixture thereof.

4. The imido copolymer as defined by claim 1, said at least one comonomer (e) comprising a chlorinated or brominated epoxy resin (e1) having an epoxy equivalent weight ranging from 200 to 2,000 and which comprises a glycidyl ether prepared by reacting, with epichlorohydrin, a chlorinated or brominated aromatic compound selected from among a bis(hydroxyphenyl)alkane; resorcinol; hydroquinone; pyrocatechol; 4,4'-dihydroxybiphenyl; or the condensation product of one of the above phenols with an aldehyde.

5. The imido copolymer as defined by claim 1, said at least one comonomer (e) comprising an N,N'-alkylene-bistetrabromophthalimide (e2).

6. The imido copolymer as defined by claim 1, said at least one comonomer (e) comprising a bis(allyloxydibromophenyl)alkane of the formula:

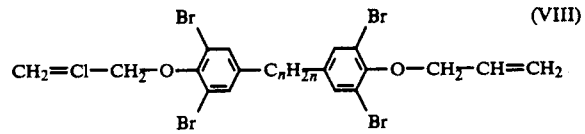

in which n is an integer equal to 1, 2 or 3.

7. The imido copolymer as defined by claim 1, said at least one comonomer (e) comprising a non-halogenated epoxy resin having an epoxy equivalent weight ranging from 100 to 1,000.

8. The imido copolymer as defined by claim 1, said at least one comonomer (e) comprising a mixture of at least two of the compounds (e1) to (e4).

9. The imido copolymer as defined by claim 1, said at least one alkenylphenol (f) comprising 4,4'-dihydroxy-3,3'-diallylbiphenyl, bis(4-hydroxy-3-allylphenyl)methane, bis(4-hydroxy-3-allylphenyl)ether, 2,2-bis(4-hydroxy-3-allylphenyl)propane or 0,0'-diallylbisphenol A.

10. The imido copolymer as defined by claim 1, wherein the amounts of said at least one N,N$0 -bis-imide (a) and said at least one sterically hindered diamine (b) are such that the ratio r:

$$r = \frac{\text{number of mol of bis-imide(s) (a)}}{\text{number of mol of diamine(s) (b)}}$$

ranges from 1.5/1 to 20/1.

11. The imido copolymer as defined by claim 1, comprising said at least one non-halogenated comonomer (c), in an amount of less than 60% of the total weight of the comonomers (a)+(b).

12. The imido copolymer as defined by claim 1, comprising a catalytically effective amount of the free radical polymerization initiator (d).

13. The imido copolymer as defined by claim 1, wherein the amount of said at least one comonomer (e) constitutes from 2% to 30% of the total weight of said at least one bis-imide (a)+said at least one diamine (b)+said optional non-halogenated comonomer (c).

14. The imido copolymer as defined by claim 1, wherein the amount of said at least one alkenylphenol (f) constitutes from 2% to 30% of the total weight of said at least one bis-imide (a)+said at least one diamine (b)+said optional non-halogenated comonomer (c).

15. The imido copolymer as defined by claim 1, in cured thermoset state, insoluble in typical polar organic solvents and not exhibiting appreciable softening below the degradation temperature thereof.

16. The imido copolymer as defined by claim 1, in curable thermosetting prepolymeric state, soluble in typical polar organic solvents and having a softening point at a temperature of less than 200° C.

17. A shaped article comprising the imido copolymer as defined by claim 1.

18. A shaped article comprising the imido copolymer as defined by claim 15.

19. A shaped article comprising the imido copolymer as defined by claim 16.

* * * * *